United States Patent [19]

Wright

[11] 4,167,901

[45] Sep. 18, 1979

[54] APPARATUS FOR PREPARING DEHYDRATED MEAT COMESTIBLES

[76] Inventor: David C. Wright, 1017 Elizabeth Ave., Naperville, Ill. 60450

[21] Appl. No.: 921,028

[22] Filed: Jun. 30, 1978

[51] Int. Cl.² .................. A23B 4/04; F26B 19/00; F26B 25/06

[52] U.S. Cl. ..................... 99/467; 34/201; 99/483; 426/465

[58] Field of Search .............. 99/467, 483; 426/465, 426/473; 34/88, 201, 202, 233, 235, 215

[56] References Cited

U.S. PATENT DOCUMENTS

| 206,860 | 8/1878 | Burdick | 34/201 X |
|---|---|---|---|
| 1,884,978 | 10/1932 | Jones | 34/233 |
| 3,513,567 | 5/1970 | Paul | 34/233 |
| 3,997,978 | 12/1976 | Stuckey | 34/202 X |
| 4,013,869 | 3/1977 | Orts | 99/467 |
| 4,035,927 | 7/1977 | Spiegel | 34/201 X |
| 4,043,048 | 8/1977 | Veater | 34/202 X |

*Primary Examiner*—Stanley N. Gilreath
*Attorney, Agent, or Firm*—Glenn W. Ohlson; Robert H. Robinson; Kenneth E. Roberts

[57] ABSTRACT

A meat dehydrator is disclosed and process utilizing same for the preparation of dehydrated meat comestibles. The meat dehydrator comprises a circular pan member and a circular grill member contacting said pan and supported above a bottom surface of the pan. A cylinder member which opens upward and downward and has upper and lower rims is mounted on bracket means of the grill to thereby define a cylindrical dehydrating chamber above the grill and spaced apart from the grill to provide an opening between the lower rim and the pan member to allow air passage therebetween. A circular lid cover is also disclosed movably mounted at the upper rim of the cylinder member to define a top of the cylindrical chamber disposed below. The lid cover includes means for mounting a heating element to extend from the lid into the cylindrical chamber to provide the heat source for the dehydration of meat. The process is disclosed utilizing the meat dehydrator which includes the steps of slicing raw lean meat into strips and then optionally marinading the strips in a seasoning salt solution. The meat strips are then positioned on the grill inside the cylindrical chamber adjacent the bottom. The ambient air inside the chamber is then heated by the heating element means to a temperature of from about 150° to 200° F. which is maintained inside the chamber for a continuous period of time from about four to six hours. A dehydrated meat comestible is thereby produced by the utilization of the disclosed apparatus and process having the moisture removed to provide a preserved tasteful food product.

7 Claims, 2 Drawing Figures

APPARATUS FOR PREPARING DEHYDRATED MEAT COMESTIBLES

THE BACKGROUND OF THE INVENTION (1) Field of the Invention

This invention relates to a process and apparatus for dehydrating meat which provides a flavorful comestible which resists spoilage.

(2) Description of the Prior Art

Dehydrated edible meat products are widely known in the food processing industry. The removal of moisture retards spoilage which otherwise would result in decomposition of the striated meat fiber from sordid bacteria and mold. Meat processes typically utilized involve curing, dessicating, smoking, and chemical preserving.

The utilization of prior art dehydration techniques results in sale to the consumer at the grocery store, restaurant or other similar food dispensing operation. The preparation of such a comestible meat product by the consumer with an apparatus for correctly processing the food item is not disclosed in the prior art. In particular, those consumers that require food stuffs having resistance to spoliation, which are also light weight and nourishing, will be found among those that enjoy the out-of-doors such as campers, hikers and the like. It would be desirable for this consumer to prepare such meat product for the consumer's own use by means of a low-cost efficient apparatus and process for utilizing it. Prior art techniques provide large scale processing of many hundreds of pounds of meat for ultimate sale to the consumer in a final package form. However, nowhere is it disclosed that the consumer can be provided with both an apparatus and process for making, at home, a meat product having moisture removed and flavored to the particular taste of the consumer.

One attempt at providing an inexpensive dehydrator is disclosed in U.S. Pat. No. 4,065,857, issued to Nelson et al. This dehydrator involves a foraminous manifold charged by a fan which pumps air into the manifold. The air is warmed during entry into the manifold by an electric resistance type heater. The warmed air is then dispersed within a box-like chamber having food stuffs disposed on movable racks therein. A thermostat control is also provided to regulate the heating unit and maintain an air temperature of predetermined level.

Another dehydrator is disclosed in U.S. Pat. No. 3,955,488, issued to Wheeler. The dehydrator therein disclosed, is a box-like chamber having multiple trays stopping short of the rear of the chamber to provide an updraft chimney portion. Below the food trays, at the bottom of the chamber, a heating element is provided. The heating element is shown to be coiled electric resistance wire which emits heat when electricity passes through. With this construction a temperature differential is experienced between the tray proximate the bottom heating element and the upper most tray distal from the heating element.

Other forms of heating chambers are provided for warming buns, rolls, and other pastries utilized in restaurants and small scale luncheon counter operations. A need has arisen to service the individual consumer. With the resurgence in camping, hiking and outdoor activities, the recreative consumer has a need for a tasteful, preserved meat product which can be easily and economically made by the use of an inexpensive dehydrator and efficient method for the user's personal implementation. The present state of the food processing industry provides complex dehydrators useful in large scale commercial enterprises which produce preserved meat products in final saleable form but does not provide a consumer with the capability for such individual preparation as the individual may desire.

(3) Objects of the Invention

Accordingly, it is the primary aim of this invention to provide a meat comestible dehydrator which is inexpensive to manufacture.

It is also an object to provide a meat dehydrator which is both efficient and easy to operate.

Further, it is an object of this invention to provide the individual consumer with a meat comestible dehydrator for home use utilizing a simple method to produce dehydrated edible meat products.

It is a correlated objective of this invention to provide a meat dehydrator which utilizes standard household current.

With more particularity, it is a goal of this invention to provide a meat dehydrator apparatus with a relatively small number of parts requiring little maintenance.

Similarly, an object of this invention is to provide a process for using a meat dehydrator which permits the individual consumer to produce dehydrated meat products flavored and seasoned to the particular taste.

SUMMARY OF THE INVENTION

In attaining the objects of the invention a meat dehydrator is disclosed which comprises a circular pan member with a circular grill member contacting the pan and supported above it. Atop the grill member, a cylinder member, having an open top and open bottom, is movably mounted to define a cylindrical dehydrating chamber above the grill. Also movably mounted, a circular lid cover is disposed at the upper rim edge of the cylinder to define the top of the cylindrical chamber. Means for mounting a heating element is provided in the lid cover extending through it into the cylindrical chamber.

The meat dehydrator is preferably comprised of a cylinder member which is of uncoated light gauge heat reflective metal. In attaining the objects of the invention it is preferable that the cylinder comprise aluminum. Similarly, it is desirable that the circular pan, grill, and lid cover members be comprised of aluminum. In further attaining the goals of this invention, an opening for air flow is provided along the lower rim of the cylinder to provide a ring-like space between the lower rim and pan bottom surface. In accordance with the invention, the meat dehydrator disclosed comprises a cylinder member having a height of from about thirteen to fifteen inches and a diameter of from about thirteen to fifteen inches. In providing the proper heating for the attainment of the goals of this invention, the means for mounting the heating element is preferably disclosed to be an electric light bulb socket having connected thereto a conventional plug and cord. The socket extends through the lid cover and has a conventional incandescent light bulb connected therein. The assembly is operable with conventional household current.

In providing a process for utilizing the meat dehydrator and attaining the goals of this invention, a dehydrating process for preparing meat comestibles is disclosed. This process comprises the steps of slicing raw lean meat into strips then disposing the strips on the grill. Next, the grill is positioned inside the cylindrical chamber adjacent the bottom. Following the grill positioning, the ambient air inside the chamber is heated by the heating element to a temperature in the range of from about 150° F. to 200° F. In attaining the primary object of this invention, the ambient air temperature inside the chamber is maintained at this range without need for adjustment by the user for a continuous period of from about four to six hours.

In utilizing the process as disclosed, it is preferred that the meat be sliced into strips of no greater thickness than one-half inch. The process as disclosed, attains the objects of this invention when the slicing step includes slicing meat of an amount no greater than will cover the grill in a single layer. In further attaining the objects of this invention, the process includes the optional step of marinading the meat strips in a salt solution containing meat flavor improving seasoning suitable to individual taste.

In utilizing the apparatus with the process as disclosed, the objects of the invention are attained by providing the opening between the lower rim edge and pan member for the removal of moisture during the dehydration process. Accordingly, it is preferable that the grill member comprise leg means support which support the grill member from about one-half inch to two inches above the pan bottom surface to provide the required opening dimensions.

All the objects of the invention are attained by the disclosed meat dehydrator and process which provide a dehydrated meat comestible individually produced by the consumer.

BRIEF DESCRIPTION OF THE DRAWINGS

The foregoing and other more specific objects of the invention are attained by the construction and method for its use illustrated in the accompanying drawings wherein.

DESCRIPTION OF THE PREFERRED EMBODIMENTS

In order to provide a dehydrated meat comestible it is desirable that moisture be removed without cooking the meat. The apparatus herein disclosed provides for the removal of moisture in raw lean meat such that the remaining moisture content is from about two to eight percent of the total weight. The term meat as referred to herein includes, but is not limited to beef, fowl, pork, goat, lamb, and seafoods such as edible fish, shrimp, crab, and lobster.

The inventive apparatus and process disclosed herein requires the cooperative effects of the elements within a critical range of tolerances. The ranges of these tolerances will be discussed below and a preferred optimal structure within this range will be defined.

Figure 1:
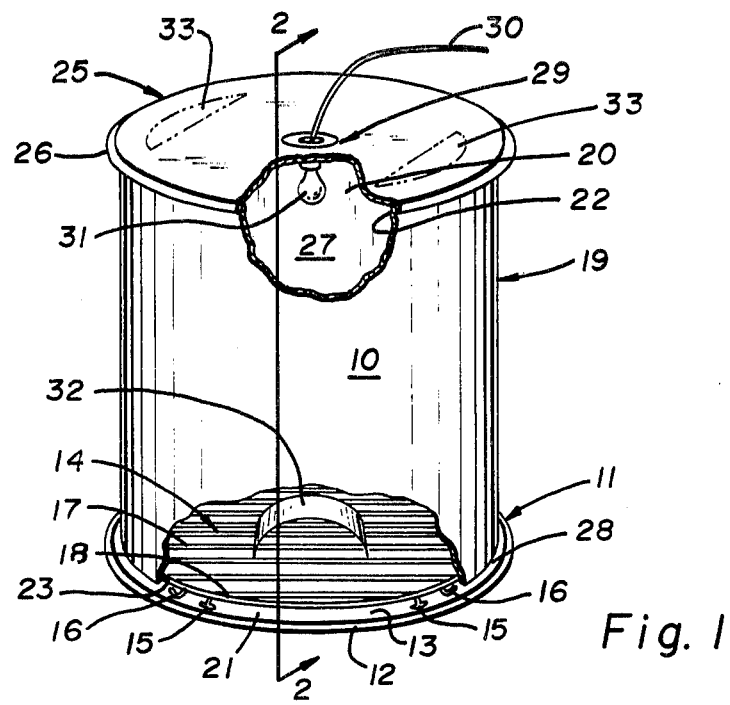
FIG. 1 is a perspective partially broken away view of the preferred embodiment for the meat dehydrator in accordance with this invention.

Turning now to FIG. 1, meat dehydrator 10 is disclosed in the preferential embodiment for this invention. It is comprised of a circular pan member 11 having a raised perimeter lip portion 12 which circumscribes a flat bottom surface 13. The conformation of circular pan member 11 can best be described as having the shape of a pizza pan. Circular grill member 14 resides supported above pan member 11 by leg means 15 supportively contacting the pan bottom surface 13. Said leg means 15 being disposed downwardly from grill member 14. Circular grill member 14 has a perimeter ring 18 defining its outer circular edge. Ribs 17 are located in substantially the same plane being disposed parallel to each other and terminating at perimeter ring 18 to define a conventional grill structure. Bracket means 16 are disclosed and project outwardly from perimeter ring 18 to serve as a support for cylinder member 19 and space it above pan member 11 to provide opening 28.

An important element of meat dehydrator 10 illustrated in FIG. 1 is cylinder member 19. Cylinder member 19 is disposed vertically having top opening 20 opposite bottom opening 21. Upper rim edge 22 circumscribes the top opening 20 and lower rim edge 23 circumscribes bottom opening 21. In the preferred embodiment of this invention, lower rim edge 23 is supported on bracket means 16. Preferably, bracket means 16 comprises three elements spaced equidistantly along perimeter ring 18 for supportive, but demountable, engagement with lower rim edge 23. Cylinder member 19 has a heat reflective interior surface 24. The desired material for the embodiment herein disclosed is aluminum having a gauge of from about 0.014 inches to 0.018 inches. This gauge tolerance, or thickness, is important, as will be discussed subsequently. Also, the diameter and height will be shown to have a specified range necessary for successful dehydration.

Movably mounted atop upper rim edge 22, circular lid cover 25 resides. Lid cover 25 has perimeter lip member 26 which depends downwardly. Similar to circular pan member 11, lid cover 25 can best be described as having the conformation of a pizza pan positioned upside down. With circular lid cover 25 residing atop upper rim edge 22, a cylindrical chamber 27 is defined. The cylindrical chamber 27 has a top lid cover 25, the sides comprise the cylinder member 19, and the bottom comprises circular pan member 11. Cylinder member 19 is supported by bracket means 16 along lower rim edge 23 which defines opening 28 for the removal of moist air during the dehydration process. Thus, cylindrical chamber 27 has the ring-like opening 28 adjacent the lower rim edge 23.

Centrally positioned on circular lid cover 25, a heating element mounting means is disclosed preferably, as illustrated, a light bulb socket 29. Socket 29 extends through lid cover 25 as shown by the broken away portion of FIG. 1. Extending away from meat dehydrator 10, a cord 30 and plug (not shown) are provided for connection to a conventional wall socket having household current typically of 110-120 volts AC. Light bulb 31 is shown connected to socket 29 and extends downward into cylindrical chamber 27. In the preferred embodiment of this invention, employing a dehydrator with the preferred dimensions, light bulb 31 is provided with a rating of about 150 watts.

Figure 2:
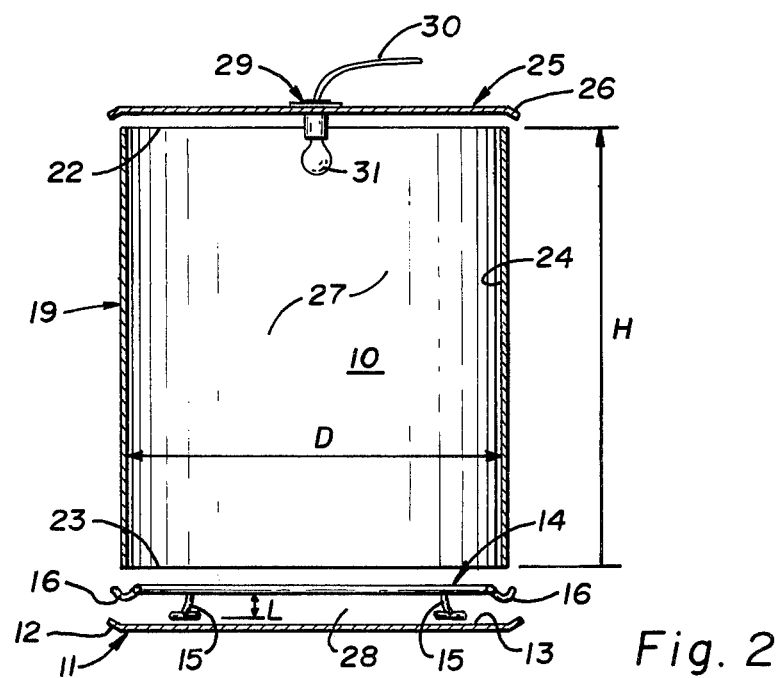
FIG. 2 is a cross-sectional view of the meat dehydrator shown in FIG. 1 taken along lines 2—2 looking in the direction of the arrows and being slightly vertically exploded to illustrate the elements.

FIG. 2 is a cross-sectional view of meat dehydrator 10 taken along a vertical line 2—2 shown in FIG. 1 passing through the center of meat dehydrator 10 looking in the direction of the arrows. The elements of meat dehydrator 10 are slightly vertically separated one from the other to best show their significant features. However, as assembled in FIG. 1, the operable construction would have the lid cover 25 resting atop cylinder member 19 which in turn rests on bracket means 16, and finally, leg means 15 would supportively contact the flat bottom surface 13 of pan member 11. It is important that socket 29 be centrally located on circular lid cover 25. As discussed, cylinder member 19 is comprised of uncoated reflective aluminum having a heat reflective interior surface 24. To attain even symmetrical heat reflection toward grill 14 from a light bulb 31 it is necessary for it to lie along the imaginary vertical axis of cylinder chamber 27. Approximate evenness of reflection is therefore provided around the interior surface 24.

The apparatus as disclosed produces a dehydrated meat comestible when the following steps are followed. The first operation is to obtain raw lean meat. Lean as used herein means free of visible fat. Therefore, if round steak were, for example, the subject of the process, the peripheral fat would be first extricated. The raw lean meat is then sliced into thin strips of no greater thickness than one-half inch. An optional step would be to secondly marinade the strips of meat in a salt solution containing meat flavor-improving seasoning. A small amount of dehydration takes place as the salt extracts water from the strips of meat but this is not necessary to the dehydration process of this invention. Conventional seasoning and spicing may be provided in the salt solution during this optional step. Such seasoning may be provided by adding one or combinations of such ingredients as the following: hickory smoked salt; finely chopped onions; garlic; liquid smoke; lemon-pepper marinade; coarsely ground pepper; seasoned salt; soy sauce; Worcestershire sauce; and other spicing suitable to the taste of the individual. Salt-free meat comestibles may be provided by marinading exclusive of salt containing seasoning. The final dehydrated meat product produced by this process allows for a variety of seasonings, with or without salt, based upon individual taste preferences.

The next step involves disposing the strips on the circular grill member 14. As provided herein, the meat dehydrator 10 is disigned to accommodate up to about two pounds of meat (e.g. round steak) being sliced into strips less than about one-half inch in thickness and disposed in a single layer on the grill. The grill is then supportively positioned on pan member 11. Cylinder member 19 is then placed on bracket means 16 in demountable supportive arrangement. Circular lid cover 25 with light bulb 31 inserted in socket 29 is then mounted at the upper rim edge 22. The cord 30 is then attached by a plug means to conventional wall socket current of 110-120 volts AC. From this point, the meat strips are dehydrated for a period of from about four to about six hours. The air inside the cylindrical chamber 27 is heated by the light bulb 31 to reach a stabilized temperature in the range of from 150° F. to 200° F. for the ambient air condition inside the chamber. This condition is maintained for the continuous period of time of from about four to six hours. At the end of this period of time, the electric cord is disconnected and the meat dehydrator 10 disassembled in the reverse order as herein disclosed. The meat product is then removed and can be eaten immediately or may be stored in a tightly wrapped foil or other conventional wrapping for later consumption.

The meat comestible produced by this process attains a moisture content of from about two to eight percent by weight. The volume of the meat, which in the working example is disclosed to be round steak, will shrink to about one-half the original size. Because the central portions of the meat disposed directly below light bulb 31 receive slightly more heat it may be necessary to deflect the radiated heat directly from the light bulb 31 away from meat portions proximately below the bulb. This can be accomplished by folding a strip of aluminum foil of about three inches by six inches into a C-shaped arch 32, shown in FIG. 1, and positioning it directly below the light bulb 31 resting on top of the strips of meat at that location.

The problem in producing a dehydrated spoilage resistant meat comestible is attaining uniformity of texture, moisture content, and flavor. Despite the apparent simplistic construction herein disclosed, several factors critically cooperate and were discovered to effectively combine only within specific tolerances to attain proper dehydration of meat. The shape of the chamber, wattage of the bulb, diameter of the chamber, gauge of the chamber wall, material comprising the cylinder, height of the cylinder, reflectivity, meat strip size, amount of meat, and venting, all are factors affecting the end result. In using a heating element, such as a light bulb, it is clear the shape of the chamber by necessity should be circular such that reflection proceeds symmetrically from the heat source. Uncoated aluminum directly from the rolling mill provides both desirable economic and reflective qualities. It was noted that when a wattage of 200 was used for the light bulb 31, the gauge of the cylinder member was required to be 0.019 inches and above. However, the disproportionate amount of drying which took place on the central portions of the meat mandated enlarging the height of the cylinder. When this enlargement took place the meat along the periphery of the grill was situated too far away from the heat source to attain uniform dehydration with interior portions. The normal wattage rating for light bulbs 100 watts and over is in increments of 50. When a bulb rated at 100 watts was tried, it provided insufficient heat at the grill surface to dehydrate the meat uniformly no matter how the other factos were varied. It was subsequently discovered that the optimum combination of height H, diameter D, wattage and gauge of the cylinder wall were the following: light bulb of 150 watts; a cylinder diameter D of thirteen to fifteen inches; a height H of the cylinder member of from thirteen to fifteen inches and a gauge of aluminum for the cylinder wall being from 0.014 to 0.018 inches. A cylinder member thickness of 0.016 inches was found to provide optimal desired dehydration when combined with a cylinder height H and diameter D of fourteen inches each. This arrangement provided evenness of dehydration within a period of time of from four to six hours and attained a temperature at the grill that stabilized and did not rise above 200° F. to thereby provide an ambient air condition essential to attain the preferred meat product. When strips of meat were cut greater than one-half inch, the thickness became a negative factor since the dehydration would not take place thoroughly. It was also determined that a corresponding strip size no greater than one-half inch would be desirable to provide thorough and even dehydration. An optimal thickness is about one-quarter inch. With the above given criteria for the meat dehydrator it is capable of producing a grill loading of meat, placed in a single layer, per each 4 to 6 hour period. As an example it is noted that above the value of two pounds, which is approximately the amount of beef (e.g. round steak) that would cover the grill surface when cut into one-half inch strips, double layers would be required and would not dehydrate properly.

It was determined, that to provide effective passage for moist air leaving the chamber through the opening 28 between lower rim edge 23 and bottom surface 13, a leg length L of at least one-half inch should be provided. The upper limit to the leg length L is about two inches since beyond that the proper temperature of from about 150° F. to 200° F. inside the chamber is not attained. It is preferred that lower rim edge 23 be supported on bracket means 16 to be spaced apart from bottom surface 13 substantially the same distance as grill member 14 is spaced apart from bottom surface 13. Venting can alternatively be provided by slotting or perforating the lid cover member 25 as illustrated in FIG. 2 with slots 33 (phantom lines). With this alternative venting construction there is no bottom venting and therefore bracket means 16 would not be provided and cylinder member 19 would rest flush along lower rim edge 23 on flat bottom surface 13. This is an optional embodiment of this invention and would involve added manufacturing expense since the perforating or slotting would necessarily involve more steps.

It is seen from FIG. 1, FIG. 2, and the process herein described, that the individual consumer can produce a batch (e.g. two pounds of round steak) of dehydrated meat comestibles suitable to individual taste in a relatively short period of time. The amount of energy utilized to provide this product involves the usage of a 150 watt light bulb for a period of time of from about four to six hours. Conventional appliance "timers" could easily be used to terminate the process at the end of the dehydration period without need for attention or manipulation by the consumer. The temperature which the circular pan member 11 experiences is only slightly higher than surrounding room temperature conditions, and therefore, meat dehydrator 10 may be placed on a table top, counter top or other flat surface without danger.

As disclosed herein, it is preferred that the amount of meat disposed on grill member 14 not exceed two pounds for proper dehydration. This amount is based on the approximate full-grill, one layer, covering by lean beef having visible fat excised. The meat cut into strips no greater than one-half inch provides approximately full coverage of grill member 14 for a weight of two pounds. Other meats such as fowl, pork, fish and lamb have varying densities and will accordingly alter the amount of weight providing grill coverage. It is therefore to be understood that the upper limitation of two pounds is a reasonable upper limit approximation for maximum utilization of the meat dehydrator of this invention with avoidance of double layering meat strips which would obviate proper dehydration.

The embodiment disclosed herein for the new and novel invention provided, allows the consumer to make individually seasoned dehydrated meat comestibles in amounts as desired. The apparatus may be manufactured at low-cost with relatively simple elements cooperating to provide the ambience within the cylindrical chamber necessary to implement dehydration of raw lean meat in accordance with the process of this invention. The illumination of a 150 watt bulb for a period of from about four to six hours is the only energy usage requirement. An energy efficient manner for providing edible meat products is thus disclosed. As noted, with the relatively simple cooperating elements, the dehydrator of this invention provides facile operation.

The embodiment disclosed is presently considered to be the preferred form of the invention but alterations and modifications may be made therein and it is intended that the claims appended hereto shall cover such changes as well within the scope of this invention.

What is claimed is:

1. A meat dehydrator comprising:
   a circular pan member having a raised perimeter lip portion surrounding a flat circular bottom surface;
   a circular grill member having leg means downwardly disposed and contacting said pan to support the grill above the bottom surface of the pan wherein the grill has a perimeter no greater than the raised perimeter lip portion of the pan, said grill member including outward extending bracket means extending from the perimeter of the grill;
   a cylinder member opening at the top and bottom and having upper and lower rim edges, said lower rim edge mounted on the bracket means of the grill defining a cylindrical chamber above said grill and providing an opening between said lower rim edge and pan member allowing air passage therebetween;
   a circular lid cover member movably mounted at the upper rim edge of the cylinder member defining a top to the cylindrical chamber disposed below; and,
   means located centrally on said lid cover for mounting a heating element extending through said lid cover into said cylindrical chamber for dehydrating meat.

2. A meat dehydrator as in claim 1, wherein the cylinder member is comprised of uncoated light gauge heat reflective metal.

3. A meat dehydrator as in claim 2, wherein the metal is aluminum having a thickness of from about 0.014 inches to about 0.018 inches.

4. A meat dehydrator as in claim 1, wherein the circular pan, grill and lid cover members are comprised of aluminum.

5. The meat dehydrator as in claim 1, wherein the leg means support the grill member from about one-half inch to two inches above the pan bottom surface.

6. A meat dehydrator as in claim 1, wherein the cylinder member has a height of from about thirteen inches to about fifteen inches and a diameter of from about thirteen inches to about fifteen inches.

7. A meat dehydrator as in claim 6, wherein the means for mounting the heating element is an electric light bulb socket having connected thereto a conventional plug and cord wherein the socket extends downwardly from the lid cover into the cylindrical chamber and has connected within said socket a conventional incandescent light bulb having a wattage of about 150 watts.

* * * * *